Nov. 8, 1938.    PALLE-FINN BEER    2,136,018

ELECTROSTATIC MIRROR OSCILLOGRAPH

Filed July 3, 1936

Material having slight electrical conductivity

INVENTOR
PALLE-FINN BEER
By Emil Bönnelycke
ATTORNEY

Patented Nov. 8, 1938

2,136,018

UNITED STATES PATENT OFFICE 2,136,018

ELECTROSTATIC MIRROR OSCILLOGRAPH

Palle-Finn Beer, Frederiksberg, Denmark, assignor to Electrical Fono-Films Company A/S, Copenhagen, Denmark, a joint stock company of Denmark Application July 3, 1936, Serial No. 88,908
In Denmark July 16, 1935

7 Claims. (Cl. 171—95)

The invention relates to mirror oscillographs for recording electrical variations, for instance, for recording sounds which are converted into alternating currents, and more especially the invention relates to electrostatic mirror oscillographs for the said purpose.

Seeing, apart from the rare case, that an oscillograph should only record or be sensitive to oscillations of a certain frequency, the natural frequency of the oscillating system in an oscillograph should preferably be higher than the highest frequency of the oscillations to be recorded or be in the upper region of said frequencies, which means that oscillographs for recording not only oscillations of very low frequencies but also oscillations of very high frequencies, for instance, any audible frequency, should have a natural frequency of a relative high value, for instance, 8000–10000 periods per second or more. Further, the natural oscillations of the oscillatory system should be damped very effectively in order to avoid disturbant shocks in the recording of sound oscillations, the frequencies of which are the same as or approximately the same at the natural frequency of the oscillatory system.

While these conditions are complied with in several previously known electrodynamic and electromagnetic oscillographs, the hitherto known electrostatic oscillographs have not been properly useful in recording electrical oscillations of rather high frequencies, because the natural frequency of the oscillatory system of such oscillographs has not been sufficiently high.

Now the electrostatic oscillographs have the advantage in preference to electrodynamic and electromagnetic oscillographs that the electrothermal losses are extremely small, wherefore the temperature of the oscillograph and, consequently, the sensitiveness of the same is substantially a constant one.

In the electrostatic oscillographs which have previously been used for recording sounds, the oscillatory motion is a rectilinear reciprocating motion of a tightly stretched band relative to stationary electrodes, which are arranged in close proximity to the band so as to face one side face of the same. The mirror of the oscillograph is supported by the said band, which is oscillated perpendicular to its flat surfaces, when a varying electrostatic field is caused to appear between the band and the stationary electrodes.

An oscillograph having a rectilinear oscillatory motion of the mirror has the drawback that the beam of light reflected from the mirror and directed, for instance, against a narrow slit in front of the moving film in order to record the oscillations on the said film, would oscillate throughout its entire length with an amplitude, which is exactly the same as the amplitude of the oscillation of the mirror and since the distance between the band and the stationary electrodes in the oscillograph is extremely small, viz., a small portion of one millimeter only, the amplitude of motion of the mirror is so diminutive that the width of the said slit should be of such extremely small value that it is very difficult to adjust the recording system to a proper position relative to the said slit and, further, dust and the like would very easily be accumulated in the slit and thereby disturb or prevent the passage of the light through the same and, further, a very narrow slit is inclined to cause refraction of the light passing the slit.

These drawbacks by the hitherto known electrostatic oscillographs, which would otherwise have been applicable for recording oscillations of rather high frequencies, for instance for recording sounds, have resulted in electrostatic oscillographs not being used in practice for this purpose.

It has been proposed in an electrostatic oscillograph to use an oscillatory system comprising a tightly stretched membrane and a mirror supported by said membrane. The oscillatory motion of a membrane is, however, not so regular that it is possible to use such an oscillograph for the purpose of recording variations, which require a great accuracy of the oscillatory motions, for instance as in the recording of sounds.

Besides the above-mentioned advantage, that the sensitiveness of an electrostatic oscillograph is of a substantially constant value, oscillographs according to the present invention have the advantage that it is possible to use mirror suspending devices, which are capable of resisting very high mechanical stresses compared with a suspension device of an electromagnetic or an electrodynamic oscillograph, even if the mirror has considerably larger dimensions than the last-mentioned oscillographs and, therefore, the suspending device in an electrostatic oscillograph may be stretched so tightly that the natural frequency of oscillation of the suspending device, including the mirror, may be adjusted to such a high value that the said natural frequency will not cause any disturbances in the recording of sounds of high frequencies. For this reason, electrostatic oscillographs are to be preferred to oscillographs of other kinds, and the present invention has for its purpose to secure an electrostatic oscillograph, in which the above-mentioned drawbacks are avoided.

The present invention is based on the recognition that electrostatic oscillographs of the kinds, which have previously been used for synchronizing alternating currents in electrical distributing plants and in which the oscillatory system has a very low natural frequency corresponding to the frequency of the alternating current in the said plant, are applicable for the recording of electrical variations, for instance, for the purpose of recording sounds or for recording the electrical currents produced by the human heart, if the suspending device of such an oscillograph is modified in the manner specified below.

The oscillatory system of this oscillograph comprises a mirror, which is supported by a tightly stretched wire or narrow band and located in an air space between two or four stationary electrodes being arranged in pairs on opposite sides of the mirror so that the electrodes face the flat surfaces of the mirror and would cause the same to oscillate about the axis of the suspension wire or band, when electrical potentials varying in opposite directions are caused to appear between the mirror and the electrodes.

According to the invention, the suspension device for the mirror in such oscillographs is a metal band, the width of which is so large that the band itself forms the oscillatory electrodes of the electrostatic system of the oscillograph, which means that the width of the band is so large that the band extends between the faces of the stationary electrodes arranged two by two in one modification in juxtaposition on either side of the band. Due to the considerable width of the band, the latter may be stretched so tightly that the natural frequency of the oscillatory system, comprising the band and the mirror supported by the band or forming an integral part thereof, may be sufficiently high to secure that natural oscillations of the oscillatory system would not cause disturbance in the recording of oscillations, the frequency of which does not exceed the high frequency of audible oscillations.

The stationary electrodes may be made from metal parts or from materials having a small electrical conductivity, the so-called half-conductors, such as agate, slate, or similar materials, or the faces of the stationary electrodes facing the band may be coated with electrical insulating materials.

The electrodes are mounted a very short distance from the flat surface of the band, for instance, so that the width of the air space between the electrodes and the band is a small fraction of one millimeter, for instance, less than 0.05 mm. Such an arrangement would cause the air in the said space or spaces to produce an effective damping of the oscillatory system. This damping may be adjusted either by varying the distance between the band and the stationary electrodes or by varying the portion of the width of the band, which is located between two electrodes on either side of the band, for instance, by displacement of the electrodes to and from one another in a transverse direction of the band.

In using electrostatic oscillographs, the electrostatic system may, as is already known, generally be polarized by impressing on the metal band of the moving system a constant polarizing potential relatively to the potential of the electrodes disposed opposite the band. If four electrodes are provided and placed opposite one another in pairs on opposite sides of the suspension strip or band of the instrument, then the electrodes and the suspension band may be connected to the polarizing source of potential in such a way that the polarizing electrostatic field extending between the band and the two opposite electrodes will be directed either in opposite directions or in the same direction as described below, provided that in both cases the band and the electrodes are connected to the potentials to be converted into mechanical oscillations in such a way that the variable electrostatic fields between the bands and the electrodes of each set are oppositely directed. In either case, the variations in the fields between the two sets of electrodes occurring simultaneously tend to rotate the moving system in the same direction.

In the drawing:—

Figure 1 is a front elevation, and

Figure 2 a horizontal section taken just above the mirror showing the suspension and the electrode system of one form of instrument in accordance with the invention;

Figure 1:
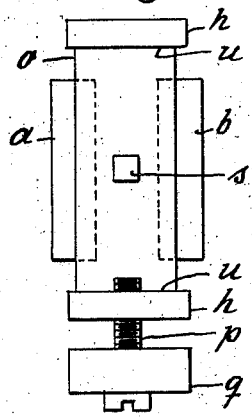
Figure 2:
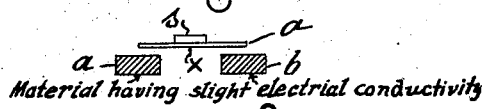
Figure 4:
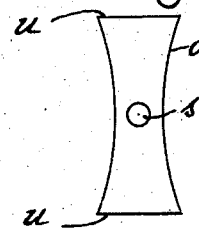
Figures 4, 5 and 6 are diagrammatic front views showing different forms and methods of attachment of the suspension strips.

Referring first of all to Figures 1 and 2, the suspension strip of metal such as aluminium or the alloy known under the registered trade mark "Duralumin" is shown at $o$ and is stretched tightly between two clamps $h$ and supports the mirror $s$ which is attached to the front surface of it. The thickness of the strip $o$ may vary within wide limits but will generally be between 0.0015 and 0.05 millimetre. As shown in Figures 1 and 2 the strip is of uniform width throughout its whole length. It may, however, be of different shape as illustrated in Figure 4 where it decreases in width towards the middle where the mirror $s$ is attached.

Figure 5:
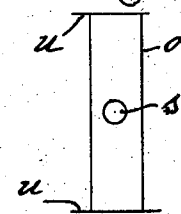
Figure 6:
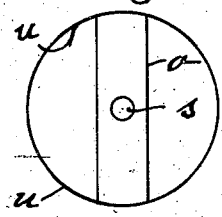

The edges $u$ at the end may either be rectilinear and at right angles to the side edges of the strip $o$, as shown in Figures 1 and 5, or the end edges may be parts of circular arcs having their centers on the center line of the strip $o$ and conveniently at the center of the mirror $s$ as shown in Figure 6. In this arrangement the edges of the strip $o$ are not stretched as tightly as the center of the strip so that the strip as a whole can resist a higher mechanical stress without rupture.

In the form of construction shown in Figure 1, the means shown for tightening the strip $o$ consists of a screw $p$ threaded into the lower clamp $h$ and passing through a lug $q$ fixed to the case of the instrument.

Figure 3:
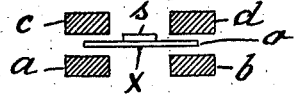
Figure 3 is a view similar to Figure 2 showing a modification in the arrangement of the electrodes and of the suspension strip.
Figure 7:
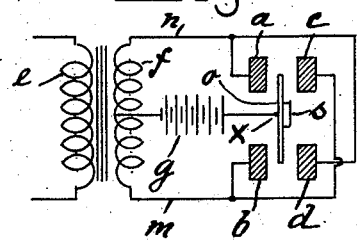
Figure 7 is a diagram of connections of the electrodes and moving system of the oscillograph.
Figure 9:
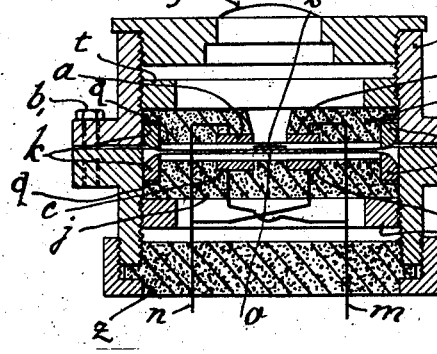
Figure 9 is a longitudinal central section of one form of construction of the oscillograph with a modified tensioning device.

As shown in Figures 1 and 2 a pair of electrodes $a$ and $b$ is provided on one side of the metal strip $o$ and on opposite sides of its centre line. In Figures 3, 7 and 9 there are two pairs of electrodes $a$, $b$ and $c$, $d$ on opposite sides of the strip $o$. The varying potentials to be converted are impressed on these electrodes when the instrument is in use in such a way that a varying electro-static field is set up between the said electrodes and causes the metal strip $o$ to oscillate about its longitudinal axis $x, x$ (Figures 1 to 3).

The method of operation of the oscillograph will be described with reference to Figures 7 and 8. In each case the varying currents or voltages to be converted into mechanical oscillations of the mirror $s$ are impressed on the primary winding $e$ of a transformer, the secondary winding $f$ of which in Figure 7 is connected across the electrodes $a$ and $b$. In the example given, there are four electrodes so that the secondary winding is also connected across the electrodes $d$ and $c$ in such a way that the two electrodes of each set $a$, $c$ and $b$, $d$ on the two sides of the axis of oscillation $x$ receive voltages of opposite sign.

The mid-point of the secondary winding $f$ is connected to the metal strip $o$ through a battery $g$ so that a constant polarizing voltage relatively to the electrodes $a, b, c, d$ is impressed on the strip $o$; by this means a polarizing electro-static field is set up between the strip $o$ and the four electrodes. The electric effects produced by this field on the strip $o$ are of equal magnitude on the two sides of the axis of oscillation $x$ and consequently when there is no varying voltage applied to the electrodes, there is no resultant torque on the moving system $os$.

If now an alternating voltage is applied to the primary winding $e$, the secondary winding $f$ impresses an alternating voltage on the four electrodes $a, b, c, d$ so that at an instant when the difference in potential between the strip $o$ and the electrodes $a$ and $d$ is increased the potential difference between the strip $o$ and the electrodes $b, c$ is decreased. Thus, the two halves of the moving system located on opposite sides of the axis of oscillation $x$ will receive at any instant torques in the same direction either clockwise or counter-clockwise. Thus, the moving system will be set in oscillation due to the action of the alternating voltage.

If in Figure 7 the electrodes $c$ and $d$ were omitted as in Figures 1 and 2, the action would have been similar, the only difference being that the polarizing voltage causes the two parts of the moving system on opposite sides of the axis $x$ to be attracted equally towards the electrodes $a$ and $b$ so that the resultant torque is still zero. The moving system is only exposed to a resulting torque therefore when an alternating voltage is applied as described above.

Figure 8:
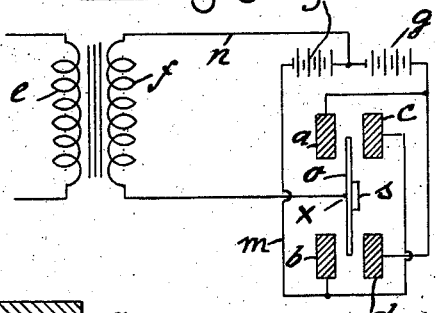
Figure 8 is a diagram of connections showing a modified method of connection.

The circuit arrangement in Figure 8 differs from that shown in Figure 7 in that the upper end of the secondary winding $f$ is connected to the mid-point of the battery $g$, so that the polarizing fields occurring between the electrodes $a, c$ and $b, d$ respectively are in opposite directions. In this case also when an alternating voltage is supplied from the winding $f$, the potential difference between the strip $o$ and the electrodes $a$ and $d$ will be increased at those instants when the potential difference between the metal strip $o$ and the electrodes $b$ and $c$ is decreased and vice versa so that in this case also the moving system $os$ receives a torque in the same direction from both sets of electrodes.

In Figures 1, 2 and 3 the mirror is shown attached to a single metal strip $o$ extending partly in front of or between the electrodes $a$ and $b$ or $a, b, c,$ and $d$.

Furthermore, as far as the invention is concerned, it is not of importance whether the length of the strips $o$ are substantially greater than the extent of the electrodes $a, b, c, d$ in the longitudinal direction of the strip $o$. The ratio of length of the strip $o$ to the extent of the electrodes $a, b, c, d$ in the longitudinal direction of the strip may be varied within wide limits.

In order to prevent sparking between the strip $o$ and the electrodes when the strip approaches the electrodes when executing oscillations of large amplitude, the faces of the electrodes facing the strip may be covered with an electrical insulating material, such as mica or sealing wax or amber. Yet again the electrodes may be made from materials which are electric semi-conductors.

With a view to exerting a damping effect on the moving system due to the air between the strip $o$ and the electrodes, the distance between the strip $o$ and the electrodes may be made as small as permissible while securing reliable insulation against the voltage likely to be set up. The distance between the strip and the electrodes may conveniently be made less than 0.05 millimetre; although this is not essential.

A detailed construction of one form of oscillograph is shown in Figure 9.

Two discs $i$ and $j$ are arranged in a casing $a_1$ and consist of some insulating material, such as amber. The four electrodes $a, b, c$ and $d$ are recessed into the facing surfaces of these discs $i, j$ so that the surfaces of these electrodes are substantially flush with the surfaces of the discs $i, j$. Two clamping rings $k$, facing one another are recessed each in one of the discs $i$ and $j$. The strip $o$ is clamped in a flat position between two flanges $r$ on the casing $a_1$, which flanges are tightly pressed against one another by screws and bolts $b_1$. The strip $o$, the longitudinal dimension of which is at right angle to the plane of the paper is tightened by screwing a screw-threaded ring $t$ into the casing $a_1$, which ring presses the upper disc $i$ downwardly thus causing an axial displacement of the rings $k$ and thereby a tightening of the strip $o$. Thereafter a lower ring $t_1$ is screwed against the bottom face of the disc $j$ to keep the same in position. Thus, the ring $k$ carried in the disc $i$ is forced against the strip $o$ at diametrically opposite points and stretches the strip to give it a suitable natural frequency of oscillation, the strip being mounted as shown in Figure 6. In this way, as shown in Figure 9, the plane of the strip $o$ has been pushed down below the meeting faces of the flanges $r$.

There is a central opening in the upper disc $i$ opposite the mirror $s$ and the upper part of the casing is closed by means of a lens holder $w$ in which a suitable lens $y$ is arranged. The casing is closed at the bottom by means of an insulating plate $z$ in which a pair of terminals is mounted to which conductors $m$ and $n$ are joined.

The electrical connection to the strip $o$ is effected by way of the metallic casing $a_1$ and the flanges $r$ on the same.

In order to provide for adjustment of the air gap between the strip $o$ and the electrodes $a, b, c$ and $d$, the rings $k$ are first ground flush with the electrodes and then a ring $q$, for example of tin foil and having a thickness corresponding to the desired dimension of the air gap, is introduced between the ring $k$ and the disc $i$ or $j$ in which it is carried. By varying the number of rings $q$ or the thickness thereof, variations of the air gap may be obtained.

I claim:

1. In an electrostatic oscillograph, a tightly stretched metallic strip, a mirror on said strip, a plurality of stationary electrodes arranged to face the flat surfaces of the strip so as to cause torsional oscillatory motion of the strip about its longitudinal axis when a varying electrical potential is caused to appear between some of the electrodes and the strip, while at the same time an oppositely varying potential is caused to appear between the strip and the remaining stationary electrodes.

2. In an electrostatic oscillograph, a tightly stretched metallic strip, a mirror on said strip, four stationary electrodes arranged in pairs on opposite sides of said strip so as to face the flat surfaces of the strip.

3. In an electrostatic oscillograph, a tightly stretched metallic strip, a mirror on said strip, four stationary electrodes arranged in pairs on opposite sides of the strip, the electrodes on either side of the strip being in juxtaposition each to one of the electrodes on the other side of the strip and electrically connected to the other of the last-mentioned electrodes, and an air space bounded between each stationary electrode and the portion of the flat surface of the strip facing the electrode, which air space is so narrow that the air in the same causes an effective damping of the oscillatory motions of the strip.

4. In an electrostatic oscillograph, a tightly stretched metallic strip, a mirror on said strip, four stationary electrodes adjustably mounted in pairs on opposite sides of the strip, the electrodes on either side of the strip being in juxtaposition each to one of the electrodes on the other side of the strip and electrically connected to the other of the last-mentioned electrodes, and an air space bounded between each stationary electrode and the portion of the flat surface of the strip facing the electrode, which air space is so narrow that the air in the same causes an effective damping of the oscillatory motions of the strip.

5. In an electrostatic oscillograph, a tightly stretched metallic strip, a mirror on said strip, four stationary electrodes arranged in pairs on opposite sides of the strip so as to face the flat surfaces of the same, the two electrodes on either side of the strip being located side by side in the transverse direction of the strip, each in juxtaposition to one of the electrodes on the other side of the strip and in electrical connection with the other of the last-mentioned electrodes, the stationary electrodes being made from a material having only a slight electrical conductivity.

6. In an electrostatic oscillograph, a tightly stretched metallic strip, a mirror on said strip, four stationary electrodes arranged in pairs on opposite sides of the strip so as to face the flat surfaces of the same, the two electrodes on either side of the strip being located side by side in the transverse direction of the strip, each in juxtaposition to one of the electrodes on the other side of the strip and in electrical connection with the other of the last-mentioned electrodes, the surface of the electrodes facing the strip being coated with an electric insulating material.

7. In an electrostatic oscillograph, a metal strip tightly stretched between adjustable clamps, a mirror on said strip, four stationary electrodes arranged in pairs on opposite sides of the strip so as to face the flat surfaces of the same, the two electrodes on either side of the strip being located side by side in the transverse direction of the strip, each in juxtaposition to one of the electrodes on the other side of the strip and in electrical connection with the other of the last-mentioned electrodes.

PALLE-FINN BEER.